US 12,180,892 B2

(12) United States Patent
Crowley et al.

(10) Patent No.: US 12,180,892 B2
(45) Date of Patent: Dec. 31, 2024

(54) MACHINE LEARNED AERO-THERMODYNAMIC ENGINE INLET CONDITION SYNTHESIS

(71) Applicant: RTX Corporation, Farmington, CT (US)

(72) Inventors: Timothy J. Crowley, Tolland, CT (US); Ramesh Rajagopalan, Glastonbury, CT (US); Sorin Bengea, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 1465 days.

(21) Appl. No.: 16/265,319

(22) Filed: Feb. 1, 2019

(65) Prior Publication Data

US 2020/0248622 A1   Aug. 6, 2020

(51) Int. Cl.
  *F02C 7/057*    (2006.01)
  *G05B 13/02*    (2006.01)
  *G06N 3/08*     (2023.01)

(52) U.S. Cl.
  CPC .......... *F02C 7/057* (2013.01); *G05B 13/027* (2013.01); *G06N 3/08* (2013.01);
  (Continued)

(58) Field of Classification Search
  None
  See application file for complete search history.

(56) References Cited

U.S. PATENT DOCUMENTS 3,996,964 A * 12/1976 McCombs .......... F04D 27/0223
                                                137/625.5
7,020,595 B1 *  3/2006 Adibhatla .......... G05B 23/0254
                                                     714/25
(Continued)

FOREIGN PATENT DOCUMENTS

EP    1103926 A2    5/2001
EP    1357487 A2   10/2003
EP    3640749 A2    4/2020

OTHER PUBLICATIONS

Madni "Leveraging Digital Twin Technology in Model-Based Systems Engineering" (Year: 2019).*

(Continued)

*Primary Examiner* — Arun Goyal
*Assistant Examiner* — William L Breazeal
(74) *Attorney, Agent, or Firm* — CANTOR COLBURN LLP

(57) ABSTRACT

A system for neural network compensated aero-thermodynamic gas turbine engine parameter/inlet condition synthesis. The system includes an aero-thermodynamic engine model configured to produce a real-time model-based estimate of engine parameters, a machine learning model configured to generate model correction errors indicating the difference between the real-time model-based estimate of engine parameters and sensed values of the engine parameters, and a comparator configured to produce residuals indicating a difference between the real-time model-based estimate of engine parameters and the sensed values of the engine parameters. The system also includes an inlet condition estimator configured to iteratively adjust an estimate of inlet conditions based on the residuals and adaptive (Continued)

control laws configured to produce engine control parameters for control of gas turbine engine actuators based on the inlet conditions.

10 Claims, 5 Drawing Sheets

(52) U.S. Cl.
CPC .... *F05D 2220/321* (2013.01); *F05D 2260/81* (2013.01); *F05D 2270/20* (2013.01); *F05D 2270/30* (2013.01)

(56) References Cited

U.S. PATENT DOCUMENTS

| | | | |
|---|---|---|---|
| 7,216,071 B2 | 5/2007 | Volponi | |
| 8,306,791 B2 | 11/2012 | Yerramalla et al. | |
| 8,720,258 B2* | 5/2014 | Meisner | G05B 23/0254 |
| | | | 73/112.01 |
| 9,115,635 B2 | 8/2015 | Abou-Nasr et al. | |
| 2010/0023238 A1* | 1/2010 | Adibhatla | G05B 23/0289 |
| | | | 701/100 |
| 2014/0090456 A1 | 4/2014 | Meisner et al. | |
| 2019/0040797 A1* | 2/2019 | Karpman | G05D 7/0629 |
| 2019/0107057 A1* | 4/2019 | Karpman | F02C 7/26 |

OTHER PUBLICATIONS

Fast "Artificial Neural Networks for Gas Turbine Monitoring" (Year: 2010).*

European Search Report issued in European Application No. 20155025.8; Application Filing Date Jan. 31, 2020; Date of Mailing Jun. 30, 2020 (7 pages).

Volponi et al., "The use of Kalman filter and neural network methodologies in gas turbine performance diagnostics: a comparative study" Journal of Engineering for Gas Turbines Power, vol. 125(4), Oct. 2003 (pp. 917-924).

European Search Report issued in European Application No. 20155025.8; Application Filing Date Jan. 31, 2020; Date of Mailing Nov. 17, 2023 (12 pages).

* cited by examiner

MACHINE LEARNED AERO-THERMODYNAMIC ENGINE INLET CONDITION SYNTHESIS

BACKGROUND

Exemplary embodiments of the present disclosure pertain to the art of a system and a method for developing an engine model and more particularly to a system of fault detection and accommodation for faults in engine inlet condition sensors.

In aircraft gas turbine engines such as turbojets and turbofans, it is necessary to monitor inlet pressure and temperature in order to accurately control engine net thrust and manage compressor/combustor operability and hot section part life. In addition, inlet temperature and pressure readings are used to detect and avoid icing and other dangerous inlet conditions. Conventional aircraft gas turbine engine control systems include dedicated pressure and temperature sensors configured to monitor inlet conditions. Inlet condition sensor faults can give rise to false pressure and/or temperature readings that may lead to incorrect engine control resulting in failure to achieve required thrust, operability and/or life.

Gas turbine piece-wise linear, state variable models (SVM) have long been employed to support the design, development, and testing of modern full authority digital engine controls (FADECs) as well as applications requiring real-time deployment of an engine model. For control law applications, this allows a simple system identification to be performed in terms of transfer functions which in turn are used to determine the control gains and compensation for the various control loops that will govern the engine operation. Thus, the SVM must be representative of the engine dynamics across the flight envelope, i.e., at altitude, as well as at sea level static conditions. This requirement is fulfilled by providing engine numerics at sea level as well as at several discrete altitude-Mach number combinations and by modeling the SVM in terms of corrected or referred parameters and interpolating between the data points.

The SVM engine model typically consists of an n-state piecewise linear structure which is validated across a flight envelope. The steady state parameter values and partial derivatives are determined through small signal perturbations of a nonlinear model of the engine, for example a state of the art performance program. These equations are directly modeled within the SVM. The steady state baselines and partial derivatives are scheduled as a function of engine power (typically N2) and flight condition.

Advantageously, since SVM's are fairly simple models, they do not impose a computational burden and are favorably suited for simplified and real-time applications. To improve on engine operation, and reduce the required sensors and measured parameter another approach may be employed with aero-thermodynamic models for the gas turbine engine. An aero-thermodynamic model employs many physics based models for sensors, components, and parameters associated with the operation of the gas turbine engine. These models are composed of physics-based models of propulsion system units (compressor, fan, turbine, combustor, duct models) connected through mass, energy, and momentum balances. The component models are typically developed from physical principles, with adjustable parameters to align with test data. The resulting propulsion system model, aggregated from the component models, is a higher fidelity representation of engine system performance than a piece-wise linear SVM. By modeling explicitly the conservation of mass, momentum and energy across all engine components, an aero-thermodynamic model is generally much more accurate accounting for numerous dynamic operational conditions for the engine. Nonlinear effects, such as variable geometry, are explicitly modeled within the aero-thermodynamic model, whereas an SVM is limited to linear approximations of these same effects. However an aero-thermodynamic model is computationally much more intensive, and until recent advancement in computer processing was limited to ground based or laboratory applications.

Such an engine model structures generally provide an adequate model for steady state and slow transient operation. For rapid transients or operation across a wide power range (e.g. idle to takeoff), the modeling techniques admits greater errors. For the purpose of parameter synthesis during these types of transients, the levels of error introduced may be unacceptable. Moreover, under a broader array of operating regimes e.g., climb, decent, windmilling, for the engine, the applicability and accuracy of the modeling techniques could be improved. To improve model accuracy, adaptable modeling techniques have been used with some success. One adaptable technique is to provide a Kalman filter (KF) observer which acts upon the residuals (r) formed by the output of the models (whether an SVM or an aero-thermodynamic model), and the actual observed measurements from the engine to provide a set of tuners, which adapt the model to match the actual observations. The tuners typically consist of a set of engine module performance parameters such as efficiencies and flow parameters which allow the engine states and output parameters to be adjusted to allow a more faithful match to the actual engine. A drawback of the adaptable model is that the steady state level of the tuners may take on an unreasonable level in order to adapt a particularly deficient model to a particular engine or engine type during development.

Another adaptable model technique includes employing a machine learned model such as an artificial neural network, implemented and pre-programmed on a computer. The artificial neural network is trained for a specified fixed initial engine state to learn the difference between the model generated by the module and the real engine under consideration. The neural network may then be used in an airborne application comparing errors generated by the model with actual data from the engine.

While such a configurations of adaptable models improve the performance of an SVM or aero-thermodynamic model, to address a wider variety of operational conditions, what is needed is a system architecture and a method to initialize and correct models beyond steady state to address transient and specific operating regimes for the engine not previously addressed.

BRIEF DESCRIPTION

A system for neural network compensated aero-thermodynamic gas turbine engine parameter/inlet condition synthesis. The system includes an aero-thermodynamic engine model configured to produce a real-time model-based estimate of engine parameters, a machine learning model configured to generate model correction errors indicating the difference between the real-time model-based estimate of engine parameters and sensed values of the engine parameters, and a comparator configured to produce residuals indicating a difference between the real-time model-based estimate of engine parameters and the sensed values of the engine parameters. The system also includes an inlet condition estimator configured to iteratively adjust an estimate of inlet conditions based on the residuals and adaptive control laws configured to produce engine control parameters for control of gas turbine engine actuators based on the inlet conditions.

In addition to one or more of the features described above, or as an alternative to any of the foregoing embodiments, further embodiments of the system may include a fault detection and accommodation system configured to detect faults in inlet condition sensors and provide validated sensed engine parameters to the machine learning model.

In addition to one or more of the features described above, or as an alternative to any of the foregoing embodiments, further embodiments of the system may include a selection function configured to at least one of: select sensed parameters inlet conditions for use by the adaptive control law in the event of no fault, select estimated parameters inlet conditions for use by the control laws in the event of inlet condition sensor fault.

In addition to one or more of the features described above, or as an alternative to any of the foregoing embodiments, further embodiments of the system may include that the selection function configured to select machine learning model based estimated parameters inlet conditions for use by the adaptive control laws in the event of inlet condition sensor fault in a selected operating regime of the gas turbine engine.

In addition to one or more of the features described above, or as an alternative to any of the foregoing embodiments, further embodiments of the system may include that the aero-thermodynamic model is configured to produce real-time model-based estimate engine parameters based on a previous iteration estimate of parameters inlet conditions, and based on engine control parameters.

In addition to one or more of the features described above, or as an alternative to any of the foregoing embodiments, further embodiments of the system may include that the parameters inlet conditions include compressor inlet temperature and compressor inlet pressure.

In addition to one or more of the features described above, or as an alternative to any of the foregoing embodiments, further embodiments of the system may include that the aero-thermodynamic model receives engine control parameters, and provides updates for a next iteration using the aero-thermodynamic model.

In addition to one or more of the features described above, or as an alternative to any of the foregoing embodiments, further embodiments of the system may include that the machine learning model is configured to produce model correction errors based on the operating regime of the gas turbine engine.

In addition to one or more of the features described above, or as an alternative to any of the foregoing embodiments, further embodiments of the system may include that the operating regime of the gas turbine engine includes at least one of air start windmilling, thrust reversing, and anti-icing modes of operation.

In addition to one or more of the features described above, or as an alternative to any of the foregoing embodiments, further embodiments of the system may include that the machine learning model is a machine neural network system.

In addition to one or more of the features described above, or as an alternative to any of the foregoing embodiments, further embodiments of the system may include that the neural network is trained to identify and learn the difference between the responses generated by aero-thermodynamic model and the real gas turbine engine under consideration for selected conditions associated with an operating regime.

Also described herein is a method for neural network compensated aero-thermodynamic gas turbine engine parameter/inlet condition synthesis. The method includes sensing engine inlet conditions at an inlet of the gas turbine engine, iteratively producing a real-time aero-thermodynamic model-based estimate of engine inlet conditions, and generating, with a machine learning model, model correction errors based at least on a difference between the real-time model-based estimate of engine parameters and the sensed values of the engine parameters. The method also includes producing residuals indicating a difference between the real-time model-based estimate of engine parameters and sensed values of the engine parameters and utilizing the estimated engine inlet conditions in an adaptive control law to produce engine control parameters to control the gas turbine engine.

In addition to one or more of the features described above, or as an alternative to any of the foregoing embodiments, further embodiments of the method may include at least one of selecting the sensed parameters inlet conditions for use by the adaptive control law in the event of no fault, and select estimated parameter inlet conditions for use by the control laws in the event of inlet condition sensor fault.

In addition to one or more of the features described above, or as an alternative to any of the foregoing embodiments, further embodiments of the method may include selecting machine learning model based estimated parameters inlet conditions for use by the adaptive control laws in the event of inlet condition sensor fault in a selected operating regime of the gas turbine engine.

In addition to one or more of the features described above, or as an alternative to any of the foregoing embodiments, further embodiments of the method may include identifying faults in the sensed parameters inlet condition sensors and providing validated sensed engine parameters to the machine learning model.

In addition to one or more of the features described above, or as an alternative to any of the foregoing embodiments, further embodiments of the method may include that identifying faults in the inlet sensors comprises flagging a fault whenever a value of the sensed engine inlet conditions differs from a corresponding value of the estimated inlet conditions by more than a predefined amount.

In addition to one or more of the features described above, or as an alternative to any of the foregoing embodiments, further embodiments of the method may include that identifying faults in the inlet sensors comprises flagging a fault whenever a value of the sensed engine inlet conditions differs from a corresponding value of the estimated inlet conditions by more than a predefined amount in aggregate or on average over several iterations of the method.

In addition to one or more of the features described above, or as an alternative to any of the foregoing embodiments, further embodiments of the method may include that the gas turbine inlet conditions are gas turbine compressor inlet temperature and pressure.

In addition to one or more of the features described above, or as an alternative to any of the foregoing embodiments, further embodiments of the method may include iteratively producing a real-time aero-thermodynamic model-based estimate of engine parameters/inlet conditions is based at least in part on at least one of previous iteration estimates of parameters/inlet conditions and engine control parameters.

In addition to one or more of the features described above, or as an alternative to any of the foregoing embodiments, further embodiments of the method may include that the model correction errors are produced based on the operating regime of the gas turbine engine.

In addition to one or more of the features described above, or as an alternative to any of the foregoing embodiments, further embodiments of the method may include that the operating regime of the gas turbine engine includes at least one of air start windmilling, thrust reversing, and anti-icing modes of operation.

In addition to one or more of the features described above, or as an alternative to any of the foregoing embodiments, further embodiments of the method may include that the machine learning model is a machine neural network system.

In addition to one or more of the features described above, or as an alternative to any of the foregoing embodiments, further embodiments of the method may include training the neural network system to identify and learn the difference between the responses generated by aero-thermodynamic model and the real gas turbine engine under consideration for selected conditions associated with an operating regime.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
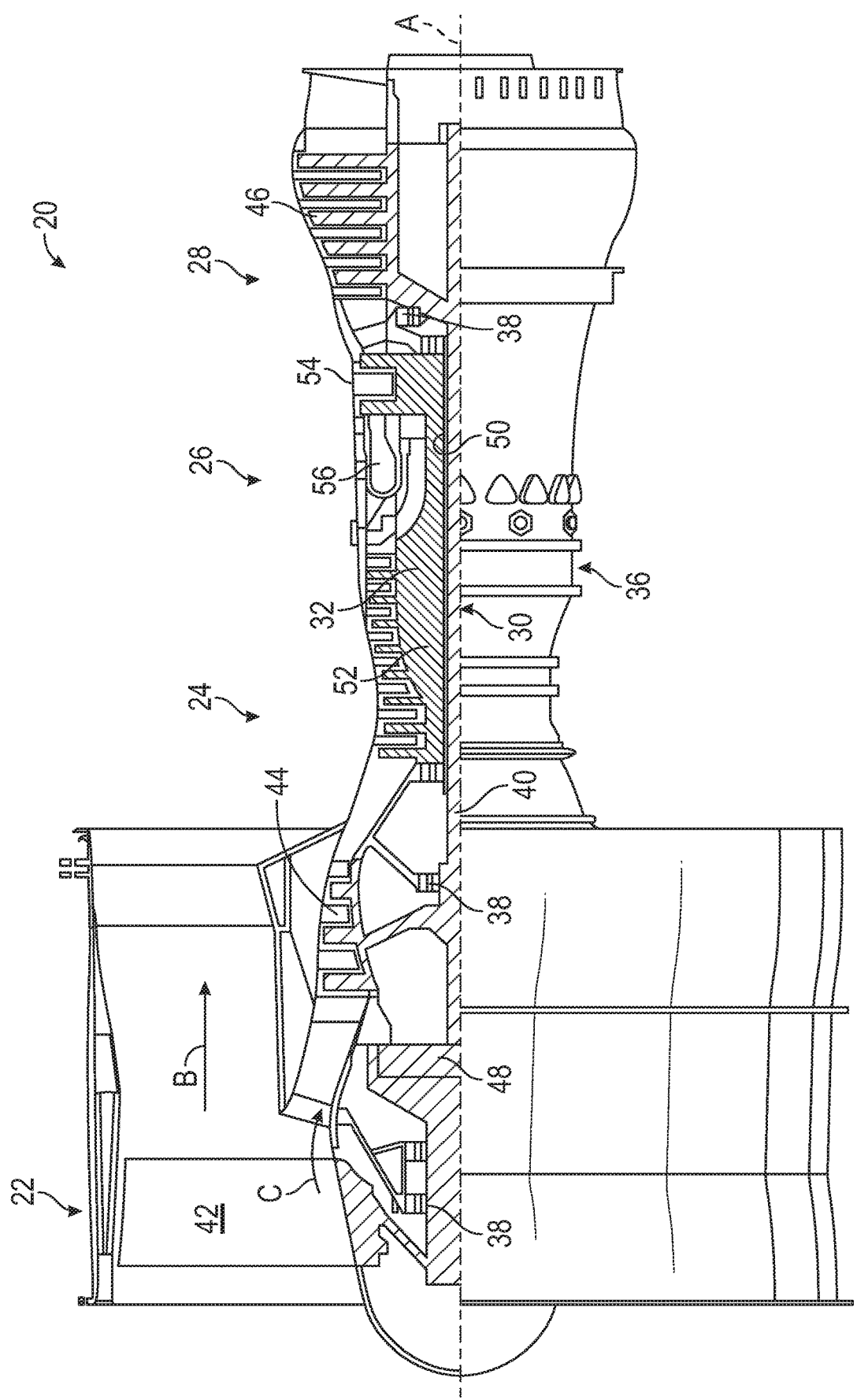
FIG. 1 depicts a simplified partial cutaway of a gas turbine engine as employed in the embodiments.

A detailed description of one or more embodiments of the disclosed apparatus and method are presented herein by way of exemplification and not limitation with reference to the Figures.

Model based control and estimation methodologies and algorithms are critical to managing and achieving full capability of complex aero-space systems. Real-time, accurate estimation of the state of a complex propulsion system, e.g., a gas turbine engine, impacts the degree to which full system capability can be realized and is perhaps one of the greatest challenges in the field of model based propulsion control systems. Challenges stem from a host of uncertainty sources and other limitations including, but not limited to transient and steady state model error and error uncertainty, measurement uncertainty, and limits of observability. Additional challenges include ambiguity in failure isolation, emergent behavior and/or unknown failure modes, and computational constraints.

Generally, key requirements of model-based estimation are decomposed from high level system safety and propulsion system operability requirements and pertain to: timely and correct detection and isolation of failures, synthesis of parameters to optimize propulsion system operability and health management during normal operation, off-nominal operation, and failures.

Model error is sometimes viewed from a probabilistic framework as being composed of systematic elements (e.g. missing thermodynamics in a combustion model) and stochastic elements (e.g. production variation in turbine area). Test-driven model development and validation is a key step in quantifying systematic errors that can cause bias in estimated propulsion system parameters and ultimately limit system capability.

A recent and powerful approach to improving the accuracy of realtime, embedded propulsion system models and estimation is the development of physics-based component aero-thermodynamic propulsion system models. These models are composed of physics-based models of propulsion system units (compressor, fan, turbine, combustor, duct models) connected through mass, energy, and momentum balances. The component models are typically developed starting from physical principles, with adjustable parameters to align the component model with test data. The resulting propulsion system model, aggregated from the component models, can be a very accurate model of the actual propulsion system performance, particularly for nominal and near-steady state operation.

For certain operating regimes, including, but not limited to, windmilling, during air start operations, and for very fast transient operation, aero-thermodynamic model error typically increases due to physical phenomena that are difficult to model accurately from first principles. Fast transients can be due to rapid changes in propulsion system thrust or rapid changes in aircraft flight conditions. The approach taken in the described embodiments to improve transient, regime-specific model accuracy is to augment an aero-thermodynamic model with machine learning, regime-specific models such as a neural network. In one embodiment, the machine learned, regime-specific models can be trained to estimate and correct for errors in the aero-thermodynamic model, directly at the output level.

The described embodiments provide for estimation of gas turbine engine inlet conditions (e.g., P2) using an aero-thermodynamic model estimator augmented with regime-specific machine learned models of the error in the aero-thermodynamic model estimate. In this example, 3 machine learned models are developed representing aero-thermodynamic transient model error for: normal thrust producing operation; on ground thrust reversing operation; anti icing; and air starting, windmilling operation. A machine learned fusion model is also created for smooth transition between regimes.

In other embodiments, regime-specific machine learned models augment aero-thermodynamic models at the aero-thermodynamic equation level. For example, accuracy of aero-thermodynamic synthesis of transient combustor pressure is improved through machine learned correcting terms within the combustor mass, energy, and momentum balance equations. The machined learned models represent corrections to the burner pressure state derivatives. The state derivative machine-learned model corrections are also regime-specific, capturing for example differences air starting, anti-icing, re-starting, windmilling characteristics and normal operation, at different operating and flight conditions.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration". Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \degree R)/(518.7\degree R)]^{0.5}$. The "Low corrected fan tip speed" as disclosed herein according to one non-limiting embodiment is less than about 1150 ft/second (350.5 m/sec).

Figure 2:
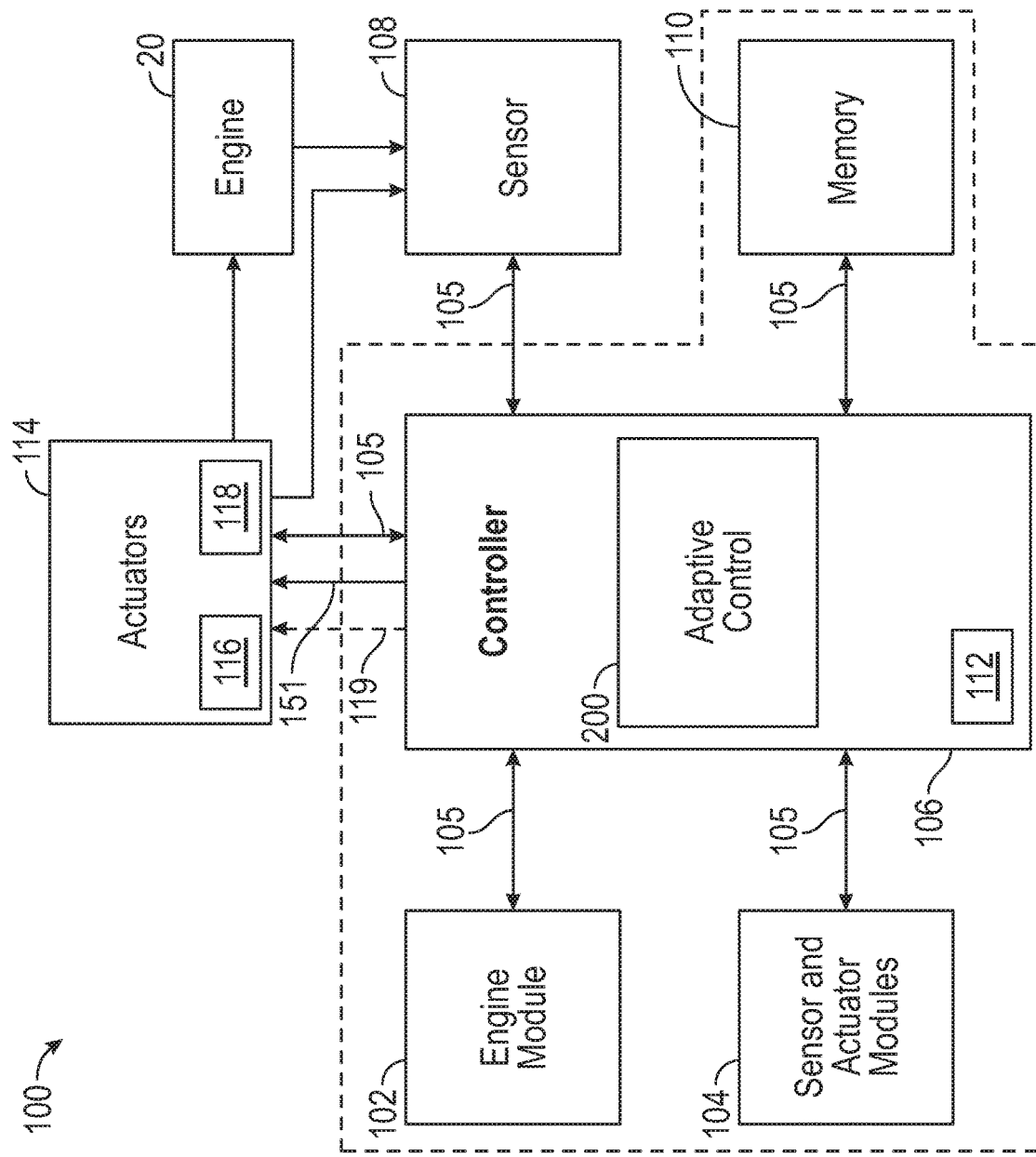
FIG. 2 is a simplified block diagram of an engine control system in accordance with an embodiment.

FIG. 2 illustrates an exemplary embodiment of an engine control system 100 as may be employed with engine 20. It should be appreciated that while the engine control system 100 as depicted and described herein may be a model based control system, other configurations and architectures are possible. As shown in FIG. 2, system 100 includes the engine 20, one or more actuator(s) shown as 114 and one or more sensors shown as 108 that are communicatively coupled with a controller 106. Sensor 108 is any of a variety of sensor employed in the engine including temperature, pressure, flow, speed and position sensors, and the like. In this embodiment, and for the purposes of description of the embodiments herein the sensor 108 is a pressure sensor associated with the engine 20, however other types of sensors (e.g., flow meters and speed sensors) also could be used.

The controller 106 running an adaptive control laws generates control parameters communicatively coupled to the actuator 114 to provide commands to control the engine 20. In an embodiment, one instance of the actuator 114 may include a motor drive 116 and motor 118 as may be employed with an electromechanical actuator. In some embodiments the actuator 114 could include solenoids, servovalves, hydraulic actuators, and the like. In addition, the controller 106 is operatively coupled to and/or optionally includes a memory 110, sensor and actuator models 104, and an engine model 102. The sensor and actuator models 104 are associated with any of the sensor(s) 108 and actuators 114, and, in this embodiment, are communicatively coupled with the engine model 102. Alternatively, functionality associated with a sensor and actuator models 104 may be an integrated with an engine model 102 in other embodiments. Further, in other embodiments, engine model 102 and/or sensor and actuator model 104 may be integrated into various components such as, for example, into a Full Authority Digital Engine Control (FADEC) system such as system 100. In an exemplary embodiment, the FADEC may be physically attached to the gas turbine engine 20 and the control parameters may include fuel flow control, guide vanes and bleed air control.

In operation, the sensor 108 monitors one or more engine operating parameter(s), such as temperature, pressure, position, and the like, and provides data corresponding to the parameter to the controller 106, which may store the data in memory 110. For example, in an embodiment, the sensor 108 measures engine parameters such as pressure and temperature and provides data to the controller 106 regarding the conditions within the engine 20. In another embodiment, it may include the position and/or speed of the actuator 114 to provide data to the controller 106 regarding the motion of the actuator 114. The controller 106 processes the data received and/or stored in the memory 110 and employs the data in various control algorithms, prognostics, diagnostics and the like. In some embodiments, the controller 106 compares from the sensor 108 to corresponding data and estimations of the engine model 102 or sensor and actuator model 104. If the difference between the measured data of the sensor 108 and the reference data of the actuator model 104 and/or engine model 102 is outside of a threshold value, the controller 106 may take various steps to address the difference including update the sensor and actuator model 104 with the data of the sensor 108, as discussed further herein. In an embodiment, by updating the reference data of the engine model 102 or actuator model 104, degradation of the components, which may occur over time, can be accommodated.

Monitoring engine parameter data provides the basis for performing gas turbine engine control and performance tracking. The dynamic behavior of measurement devices, particularly detecting and quantifying the changes in the dynamic responses of measurement devices, e.g., sensors 108, is useful in performing gas turbine engine performance tracking. By monitoring sensor data based on transient behavior, steady state behavior, and trend data, aspects of operation or even degradation of engine 20, sensors 108, and/or actuators 114 may be detected that may not be perceived when the engine is operating at steady state alone. Ascertaining and distinguishing performance trends may allow the adaptive control 200 or the engine model 102 and sensor and actuator model 104 to be updated in order to improve the engine 20, sensor 108 and actuator 114 operation, performance and further, potentially compensate for engine 20, sensor 108, or actuator 114 degradation.

The described embodiments include adaptive model-based control systems 100 and adaptive control processes 200 implementing the model based control. These systems 100 and methods 200 may be employed to improve the performance of the propulsion system 20 and system components e.g., actuators 114 as well as to detect deterioration and/or degradation, faults, failures or damage to an engine 20, and/or components thereof including sensors 108 and actuators 114. Furthermore, the described embodiments facilitate incorporating such information into the various models, optimizations, objective functions, constraints and/ or parameters in the control system 100 to allow the control system 100 to improve performance and/or operability as possible given the current engine 20 condition or the condition of a component thereof. Current data regarding the dynamic characteristics of the engine 20, sensors 108 and actuators 114 providing this information is useful in maintaining appropriate control. Particularly, it is desirable for sensor and actuator models 104 and adaptive control to model sensors 108, actuators 114, and the like to accommodate variations in components and measured conditions associated with the engine 20. This accommodation is accomplished by updating the engine model 102, sensor and actuator models 104, and or the models of the adaptive controls 200 in the model-based control system 100 with information regarding the states of the engine 20, sensors actuators 114 and the like. In particular, updating the engine model with data from the sensor(s) 108 regarding the status of the engine inlet temperatures and pressures. The engine models 102 and sensor/actuator model 104 in the control system 100 may be adapted by using a filter, tracking filter, logic, moving horizon estimation, or other suitable method to modify states, variables, quality parameters, scalars, adders, constraints, limits or any other adaptable parameter so that the performance and limitations of the model match that of the engine 20, sensor 108, or actuator 114 after the parameter is changed. It should be appreciated the while for the purposes of discussion each of the adaptive control law 200 as well as engine model 102 and sensor and actuator model 104 of the control system 100 are described separately and as separate entities, such description is merely for illustration. The models could be separated or integrated without distinction or deviation from the disclosure herein and include additional components and models as described herein. For example, in one embodiment, the engine model, 102, and sensor/actuator model 104 may each be integral parts of the adaptive control method 200 of controller 106. Moreover, in some embodiments, the models or portions thereof, may be integral with other components such as the actuator 114, or another controller employed in a particular embodiment.

In embodiments described, any physical system, control system 100 or any property of the engine 20 or engine subsystem may be modeled, including, but not limited to, the engine itself, the gas path and gas path dynamics; sensors 108, actuators 114, effectors, or other controlling devices that modify or change any engine behavior. Gas turbine engines such as engine 20 due to the large range of operating conditions and power levels experienced during operation may require complex modeling techniques. The models 102, 104 of these components and/or systems may be physics-based models (including their linear approximations). In an embodiment an aero-thermodynamic model for the engine 20 is a network of physics-based turbo-machinery, combustor, duct, and other related models, representing gas path architecture of the engine 20 and connected by mass, energy, and momentum balances. The model 102 is a system of nonlinear equations representing conservation of mass, momentum and energy across all engine components and an associated solver. At each time step the model determines specific values associated with pressure ratios, maplines, etc. that can solve the nonlinear system of equations. Additionally, or alternatively, the models may be based on linear and/or nonlinear system identification, neural networks, and/or combinations of all of these. Logically, turbine operation is restricted due to mechanical, aerodynamic, thermal and flow limitations. The controller 106 can be multiple-input multiple-output (MIMO) to account for interactions of the control loops, and can be model-based, and can have limits or constraints built as an integral part of the control formulation and optimization to avoid designing controllers for each limit.

The controller 106 may also employ memory 110 to store instructions that are executed by one or more processors 112. The executable instructions may be stored or organized in any manner and at any level of abstraction, such as in connection with a controlling and/or monitoring operation of the sensor system 108 or actuators 114. The one or more processors 112 can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 110 may include random access memory (RAM), read only memory (ROM), or other electronic, optical, magnetic, or any other computer readable medium onto which is stored data and algorithms in a non-transitory form. The controller 106 can also interface with a communication bus 105 to send and receive data values and/or executable instructions. The controller 106 can include other interfaces (not depicted), such as various outputs, wireless communication interfaces, and the like.

Embodiments of the system 100 may include adaptive control with models 200 including model 102 for the engine 20, executable by one or more processors 112, where the adaptive model 200 include a plurality of component models e.g., engine model 102, and/or sensor and actuator model 104 configured to correspond with a modeled state of the mechanical system 100 and components thereof. Similarly, models e.g., sensor and actuator model 104 for sensors 104 and other components may also be employed. As further described herein, the adaptive model 200 can be used to generate prediction results regarding future states of the control system 100, and in particular the engine 20, sensors 108 and actuators 114. The system 100 and controller 106 can capture sensor data from the sensor system 108 as observed history, which may also capture data snapshots surrounding operations, data trends, detected failures, abnormal conditions, and/or other targeted conditions. The observed history can be used real-time or offline to further refine the adaptive control 200 and develop/improve operational and failure mode definitions.

Figure 3A:
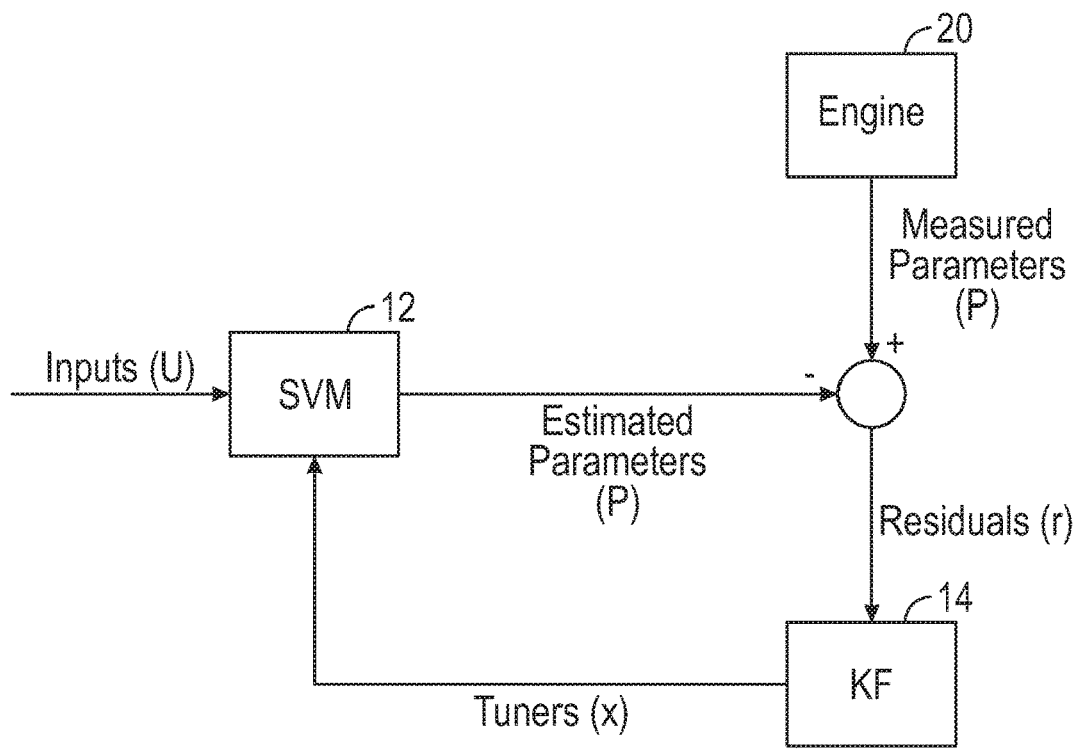
FIG. 3A illustrates a simplified diagram of a state vector model with a Kalman filter estimator.

FIG. 3A depicts an existing SVM model based parameter synthesis (e.g., engine inlet condition such as inlet pressure $P_2$ synthesis) with an SVM model 12. The model may employ any suitable n state piecewise linear structure known in the art. The inputs (u) represent a particular flight condition for the engine. The inputs (u) may vary from engine to engine model, but typically will take the form of parameters such as fuel flow, variable geometry position such as variable stator vane position, stability bleed commands, various accessory bleeds, horsepower extraction, and other parameters necessary to drive the models. Environmental factors such as ambient temperature, pressure, Mach number, altitude, and throttle position may also be inputted.

An adaptable SVM 12 such as that shown in FIG. 3A has been employed, to improve the parameter synthesis during certain transients, and to mitigate the transients effects. One adaptable SVM technique which has been employed is to provide a Kalman filter (KF) observer 12 which acts upon the residuals (r) formed by the comparison of the output P circumflex (estimated parameters) of the SVM 10 and the actual observed measurements of the parameters P from the engine 20. A set of tuners x (circumflex) ({circumflex over (x)}) is generated by the Kalman filter 14, which adapt the SVM 12 to match the actual observations (P) from the engine 20 (hence driving the residuals (r) to zero on the average). The tuners x circumflex({circumflex over (x)}) consist of a set of engine module performance parameters such as efficiencies and flow parameters which allow the engine states and output parameters to be adjusted to allow a more faithful match to the actual engine 20.

The Kalman filter observer module 14 may comprise any suitable Kalman filter observer construction known in the art and may also be implemented by the pre-programmed computer. The initial tuners {circumflex over (x)}0 are a user specified vector of initial tuner values. The tuners within the model typically take the form of changes in engine component efficiencies, flow capacities, and turbine nozzle areas. The initial value could be a vector of zeros for instance which would imply that the assumed state of the engine is nominal, i.e. zero delta form reference with the reference being a reference engine, such as the average production engine. Alternatively, the vector could be non-zero if there was some information known or assumed regarding the particular engine 14 under consideration.

A challenge of the adaptable SVM model 12 shown in FIG. 3A is that the steady state level of the tuners may take on an unreasonable level in order to adapt a particularly deficient SVM model to a particular engine or engine type, particularly for transient conditions or operation regimes that present more transient conditions. To address this challenge, a system architecture and a method to initialize the SVM 12 to reflect a given initial state (in terms of the efficiencies and flow parameters) has been employed.

Figure 3B:
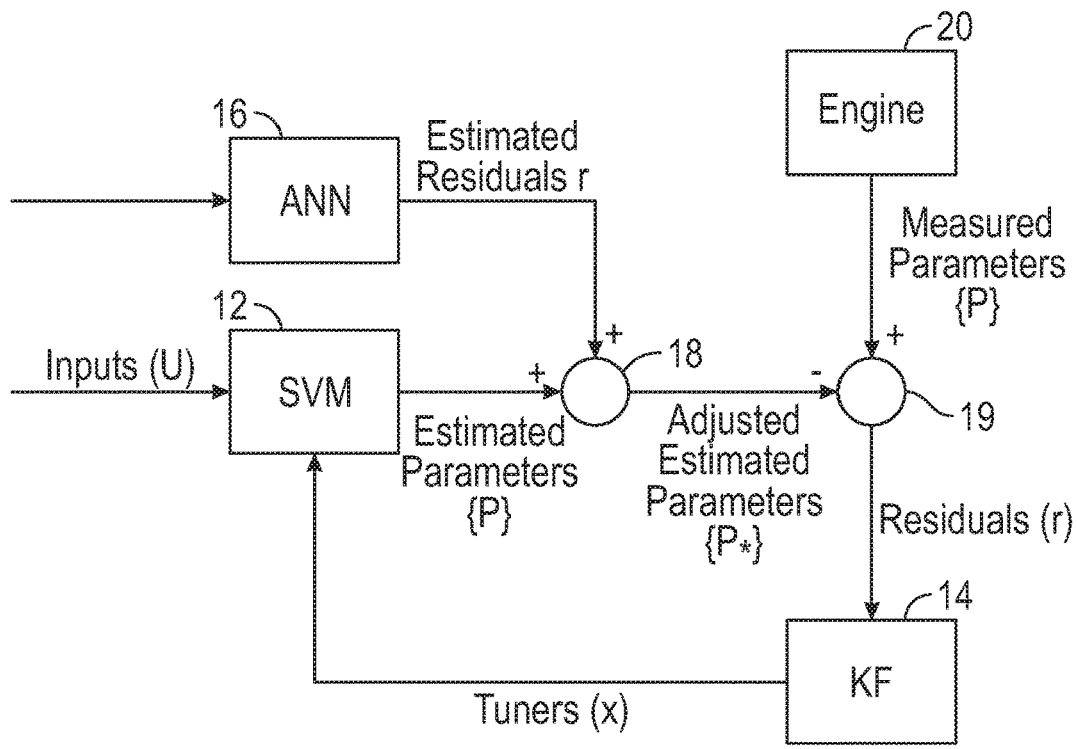
FIG. 3B illustrates a simplified diagram of a state vector model with a Kalman filter estimator further including a neural network for estimating residuals.

FIG. 3B expands on the adaptable process of FIG. 3A by including an artificial neural network 16 implemented by the pre-programmed computer. Initially the artificial neural network 16 is trained for a specified fixed initial engine state to identify and learn the difference between the responses generated by model 12 and the real engine 14 under consideration. The neural network 16 is programmed to generate a plurality of estimated residuals {circumflex over (r)}. The artificial neural network 16 may have any desired architecture. For example, it may have an input layer, an output layer, and a number of hidden layers. Each of the layers may have a plurality of nodes which may be connected in any desired manner. The neural network 16 receives the same inputs as the state variable model module 12. Depending on the configuration of the neural network 16, additional inputs may be used to perform a sort of regime classification to make the modeling easier.

When implemented, the system 20 constitutes a hybrid model utilizing a physics based component (the module 12) and an empirical component (the neural network 16). In this implementation mode, the state variable engine model module 12 is supplied with the engine inputs (u), as well as a set of tuners {circumflex over (x)} from the Kalman filter observer module 14, and is used to generate a plurality of estimated parameters {circumflex over (P)}. The neural network 22 receives the same inputs supplied to the module 10 and is used to generate the set of estimated residuals {circumflex over (r)}. The estimated residuals {circumflex over (r)} and the estimated parameters {circumflex over (P)} are compared at comparator 18. To formulate a set of adjusted estimated parameters denoted {circumflex over P*}. The adjusted estimated parameters {circumflex P*} and the measured engine parameters P are fed to a second comparator 19. The second comparator 19 uses these inputs to generate a set of residuals r which are supplied to the Kalman filter observer module 12.

As can be seen from FIG. 3B, the output of the system 100 in the implementation mode is internal to the system. The artificial neural network empirical element in the system 100 accounts for the initial difference between the actual engine 20 and the model 102, 104 with assumed initial tuner vector. This configuration has the advantage of relieving the tuners from absorbing the model error and allows the tuners to track component performance degradation of the engine 14 over time in terms of efficiencies and the like. As a result, the system 100 shown in FIG. 3B more accurately reflects the real engine 20.

As described herein, while such a synthesis approach performs well for most applications, such synthesis, can yield significant errors under certain operational regimes. The described embodiments provide for modification and improvements to such synthesis techniques to address such operational regimes.

Figure 4:
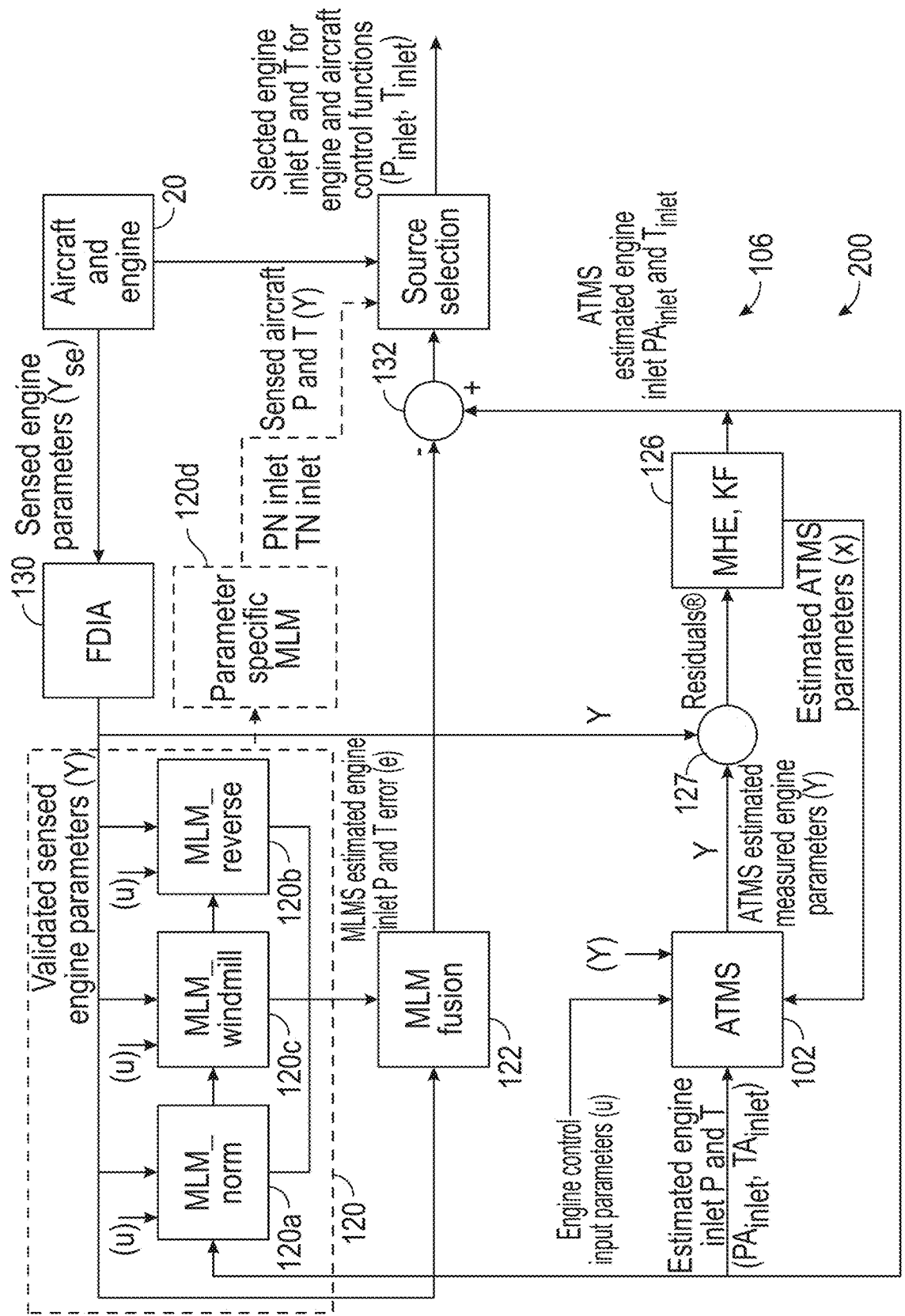
FIG. 4 illustrates a system for neural network compensated aero-thermodynamic synthesis in accordance with an embodiment.

FIG. 4 depicts a simplified block diagram of a portion of the adaptive control process 200 employing a modeling processes configured to address regime specific errors generated in the model 102. In an embodiment, an aero-thermodynamic model system (ATMS) is employed for the engine model 102 and sensor and actuator models 104, denoted ATMS and 102 for simplicity, with machine learning model compensation. For certain operating regimes, including, but not limited to, windmilling, during air start operations, anti-icing, and for very fast transient operation, aero-thermodynamic model error typically increases due to physical phenomena that are difficult to model accurately from first principles. Fast transients can be due to rapid changes in propulsion system thrust or rapid changes in aircraft flight conditions. The approach taken in the described embodiments to improve transient, regime-specific model accuracy is to augment an aero-thermodynamic model 102 with machine learning model 120 e.g., neural network, i.e., regime-specific model(s).

Continuing with FIG. 4, sensed parameters denoted $Y_s$ are measured from the engine 20 and are processed through a Fault Detection Identification and Accommodation (FDIA) process 130. The FDIA 130 provides for validation of the sensed parameters Ys denoted Y, which are then provided to the machine learning model 120 and specifically 120a, 120b, and 120c, along with an input vector U and the previous parameter engine parameter estimates. In an embodiment, the FDIA validation is based on identifying a fault when a value or a rate of change of a value of at least one of the sensed parameter e.g., inlet pressure or temperature falls outside of a specified range. In another embodiment the FDIA validation is based on identifying faults when the sensed parameter (e.g., inlet conditions) differs by more than a threshold value from the estimated inlet conditions. Each MLM can be a multi-layer neural network or other form of nonlinear, machine learned models. Each MLM is trained with data from engines operating within a specific operating regime, i.e., windmilling. As described herein, the inputs (U) represent a particular flight condition for the engine 20. The inputs (U) may vary from engine to engine model, but typically will take the form of parameters such as fuel flow, variable geometry position such as variable stator vane position, stability bleed commands, various accessory bleeds, horsepower extraction, and other parameters necessary to drive the models. Environmental factors such as ambient temperature, pressure, Mach number, altitude, and throttle position may also be employed.

In one embodiment, the machine learned, regime-specific models 120 can be trained to estimate and correct for errors in the aero-thermodynamic model 102 directly at the output level to address the regime specific errors that would otherwise be generated by the aero-thermodynamic model 102 for the engine 20, and sensor and actuator model 104. The described embodiments provide for estimation of gas turbine engine inlet conditions (e.g. P2) using an aero-thermodynamic model estimator augmented with regime-specific machine learned models 120 of the error in the aero-thermodynamic model 102, 104 estimate. In this example, three machine learned models 120a, 120b, and 120c are developed representing aero-thermodynamic transient model error for three operating regimes. The three regimes include, but are not limited to: normal thrust producing operation; ground thrust reversing operation; and air starting, windmilling operation. The machine learning models 120a, 120b, 120c, respectively is directed at each of these operating regimes.

The machined learned models 120a, 120b, 120c represent (and are configured to correct) specific errors in the estimated parameters. The machine-learned model corrections are also regime-specific, capturing for example differences air starting, windmilling characteristics and normal operation, at different operating and flight conditions. In another embodiment, regime-specific machine learned models 120a, 120b, and 120c augment aero-thermodynamic model 102 at the aero-thermodynamic equation level. For example, in an embodiment, accuracy of aero-thermodynamic synthesis by the model 102 of transient combustor pressure is improved through machine learned correction terms within the combustor mass, energy, and momentum balance equations executing within the aero-thermodynamic model 102 for the engine 20. For this particular embodiment, the machined learned models 120a, 120b, 120c can be configured to correct for errors in specific engine model parameters, states, and state derivatives such as the derivative of engine burner pressure with respect to time.

The machine learned models 120 may be neural network programmed to generate a plurality of estimate correctors (errors for the desired regimes). The machine learning models e.g., neural network 120 may have any desired architecture. For example, it may have an input layer, an output layer, and a number of hidden layers. Each of the layers may have a plurality of nodes which may be connected in any desired manner. The machine learning models 120 receive the same inputs as the ATMS model 102 (as described further herein) as well as the validated sensed parameters Y as described herein. Depending on the configuration of the machine learning model 120 (neural network), additional inputs may be used to perform the regime classification to make the modeling easier. A machine learned fusion model 122 is also created and employed for smooth transition between the machine learning models 120*a*, 120*b*, and 120*c* and regimes. The machine learned fusion model 122 receives the corrections from each of the machine learning models 120*a*, 120*b*, and 120*c* and directs the appropriate corrections to comparator 132 under selected conditions (e.g. depending on the particular operating regime). Comparator 132 compensates the parameter estimates from the observer/estimator 126 with the error corrections from the regime specific machine learning models 120*a*, 120*b*, and 120*c*.

In yet another embodiment, the machine learned, regime-specific models 120 can be partitioned and trained to estimate and correct for errors in the aero-thermodynamic model 102 directly at the output level to address the regime specific errors that would otherwise be generated by the aero-thermodynamic model 102. For example, in an embodiment to provide a specific error correction for the estimation of gas turbine engine inlet conditions (e.g. P2 and inlet temperature) using an aero-thermodynamic model estimator augmented with a regime-specific machine learned models trained for these parameters 120*d*. In some configurations which implement corrections at equation level, outputs from the regime-specific MLM models would be equation adjustments to the ATMS 102 and therefore would be inputs to the ATMS).

In another embodiment, a regime specific machine learning model 120 can be configured to directly estimate inlet parameters. In this instance, a machine learning estimate $\bar{p}_{\bar{N}}$ inlet and $\bar{T}_{\bar{N}}$ inlet is directly provided by the neural network 120*d*. The estimate is then provided to the source selection function as a possible selection or combination with the model based estimates.

Continuing now FIG. 4, depicting neural network compensated aero-thermodynamic model system (ATMS) based parameter synthesis, (e.g., engine inlet condition such as inlet pressure and temperature $\bar{p}_{\bar{A}}$ inlet and $\bar{T}_{\bar{A}}$ inlet synthesis). The validated sensed engine parameters Y are also provided to the ATMS model 102 and compared to the estimated measured parameters $\hat{Y}$ to form the residuals $\hat{r}$. An observer/estimator 126 which acts upon the residuals (r) formed by the comparison 127 of the output $\hat{Y}$ (Y circumflex) (estimated measured parameters) of the ATMS 102 and the actual observed measurements of the parameters Y from the engine 20. A set of tuners once again denoted $\hat{X}$ ({circumflex over (x)}) is generated by the observer/estimator 126, which adapts the ATMS 102 to match the actual observations (Y) from the engine 20 (hence driving the residuals (r) to zero on the average). The tuners, $\hat{X}$ ({circumflex over (x)}) consist of a set of engine module performance parameters such as efficiencies and flow parameters which allow the engine states and output estimated parameters $\hat{Y}$ (Y circumflex) to be adjusted to allow a more faithful match to the actual engine 20.

In the described embodiments, the observer/estimator module 126 may comprise any suitable Kalman filter (KF) observer/estimator construction known in the art. Other embodiments may include other observer/estimator configurations such as a Moving Horizon Estimator (MHE). Both estimation methods exhibit demonstrated benefits in terms of bias, variation and robustness. Both methods use selected internal parameters (component efficiencies, flow capacities, pressures, temperatures) of the ATMS 102 in order to adjust the model-based predictions until they converge to their respective sensor measurements. The two methods have been employed for estimating various engine parameters, including inlet conditions, and depending on the problem formulation and available real-time computational resources either of them can be used in conjunction with the ATMS 102. The Kalman Filter estimation method is commonly most suitable for linear models (e.g., SVM as described herein) with no constraints on model variables and limited computational resources. When the models are nonlinear, such as ATMS 102, include physical limitation of internal variables, and computational complexity is not a limitation, the Moving Horizon Estimation method may yield better results.

In an embodiments, at each time step, $t_k$, the observer/estimator 126 employing a MHE method calculates the selected internal ATMS 102 parameters as solution of an optimization problem formulated over a previous time interval $[t_k - N^*\Delta, t_k]$ on which all the measurements associated with model outputs (gas path pressures and temperatures) and inputs (fuel flow, variable geometry actuators, power and flow extractions) are available. The optimized parameters (component efficiencies and flow capacities, unmeasured pressures and temperatures) ensure that the model-based prediction tracks the measurements (measured gas path pressures and temperatures), that the parameters do not change more that intended or physically possible. This objective is achieved by means of penalties on parameter changes included in the objective of the optimization problem formulation or direct constraints on parameter values or their rates of change. The optimization problem; the model, constraints, and objective; are formulated such that a solution is guaranteed to be reached within a selected number of time step(s), $\Delta$. Customized versions of known optimization solvers can be used in order to guarantee that the method converges within this time frame.

The estimated parameters (e.g., inlet pressure and temperature) from the observer/estimator 126 are adjusted with the regime specific error corrections at comparator 132. The resultant is provided to source selection process 134 for output to the adaptive control 200 to control the engine accordingly. The source selection process outputs the sensed parameters, i.e., the sensed parameters such as engine inlet pressure and temperature from the engine 20 and sensors 108 (FIG. 2) or the estimated parameters, i.e., estimated inlet temperature and estimated pressure.

Figure 5:
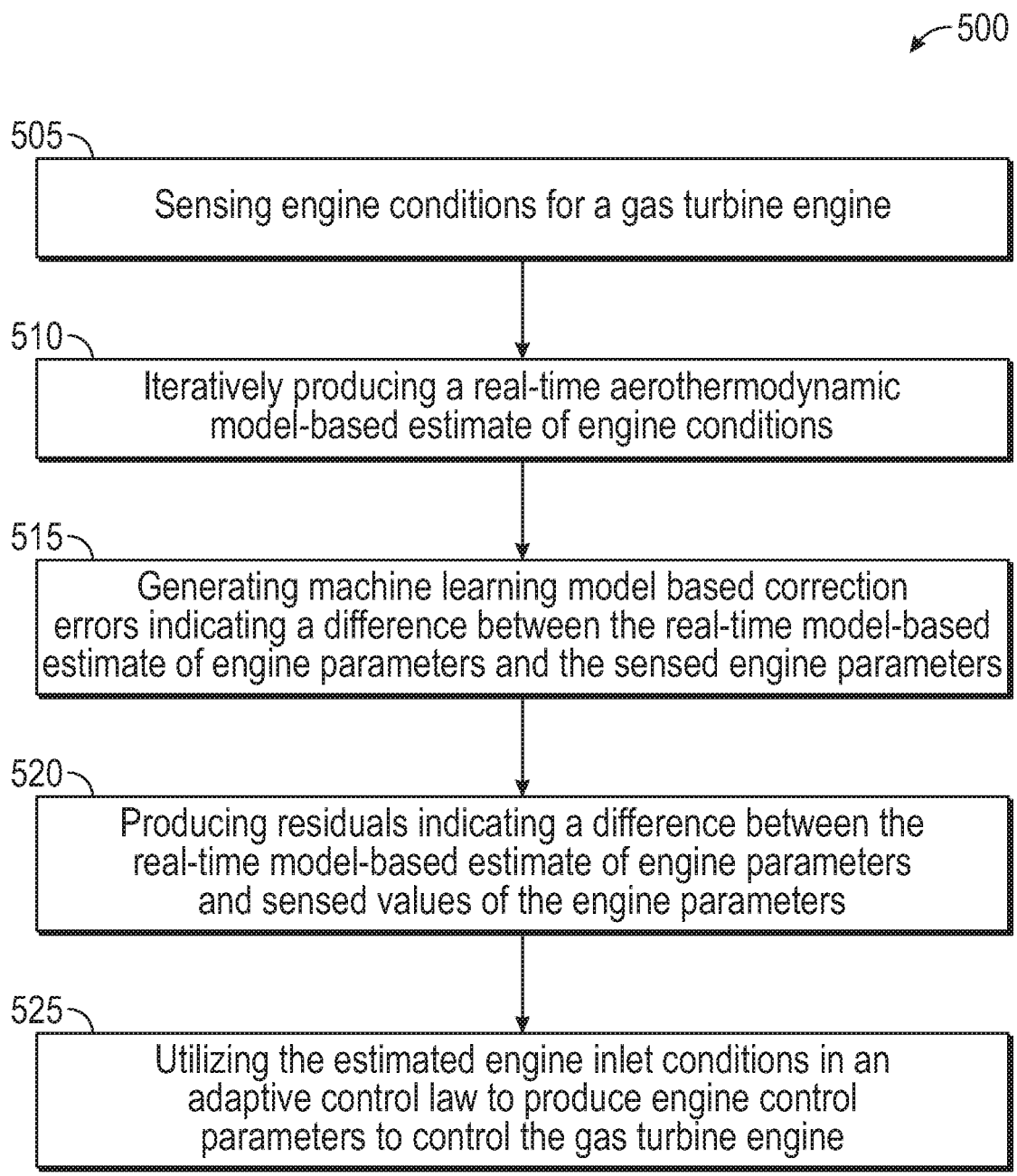
FIG. 5 illustrates a process neural network compensated aero-thermodynamic synthesis according to an embodiment.

FIG. 5 depicts a flowchart of the method 500 for neural network compensated aero-thermodynamic gas turbine engine parameter/inlet condition synthesis. The method 500 initiates at process step 505 with sensing engine inlet conditions at an inlet of the gas turbine engine 20. At process block 510 the method continues with iteratively producing a real-time aero-thermodynamic model-based estimate of engine inlet conditions as described herein. A machine learning model 120, is employed to generate model correction errors indicating a difference between the real-time model-based estimate of engine parameters and the sensed values of the engine parameters as depicted at process block 515. The method 500 continues with process step 520 and producing residuals indicating a difference between the real-time model-based estimate of engine parameters and sensed values of the engine parameters. Finally, the method 500 concludes with utilizing the estimated engine inlet conditions in an adaptive control law 200 to produce engine control parameters to control the gas turbine engine 20 as depicted at process step 525.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system forneural network compensated aero-thermodynamic engine model parameter synthesis, the system comprising:
    at least one sensor configured to output sensed values of engine parameters of a gas turbine engine;
    a controller in signal communication with the at least one sensor and configured to control gas turbine engine actuators of the gas turbine engine, wherein the controller comprises:
    an aero-thermodynamic engine model configured to produce real-time model-based estimates of the engine parameters;
    a plurality of machine learning models configured to generate model correction errors based at least on a difference between the real-time model-based estimates of the engine parameters and sensed values of the engine parameters;
    a first comparator configured to produce residuals indicating the difference between the real-time model-based estimates of the engine parameters and the sensed values of the engine parameters;
    an inlet condition estimator configured to iteratively adjust an estimate of inlet conditions based on the residuals to produce selected values of the estimates of the inlet conditions; and
    a second comparator configured to compensate the selected values of the estimates of the inlet conditions based on error corrections corresponding to a first aero-thermodynamic transient model for a first operating regime and a second aero-thermodynamic transient model for a second operating regime;
    adaptive control laws configured to produce engine control parameters for control of the gas turbine engine actuators based on the selected values of estimates of the of inlet conditions,
    wherein each machine learning model of the plurality of machine learning models is a machine neural network system, and wherein a first machine learning model of the plurality of machine learning models represents a first aero thermodynamic transient model error for a first operating regime, and a second machine learning model of the plurality of machine learning models represents a second aero-thermodynamic transient model error for a second operating regime that is different from the first operating regime, and
    wherein each machine learning model of the plurality of machine learning models output their respective model correction errors under conditions selected according to the first operating regime and the second operating regime of the first machine learning model and the second machine learning model, respectively.

2. The system of claim 1, wherein the controller further includes a fault detection and accommodation system configured to detect faults in inlet condition sensors and provide validated sensed engine parameters to each machine learning model of the plurality of machine learning models.

3. The system of claim 1, wherein the aero-thermodynamic engine model is configured to produce real-time model-based estimate engine parameters based on a previous iteration of the estimates of inlet conditions, and based on engine control parameters.

4. The system of claim 1, wherein the aero-thermodynamic engine model receives engine control parameters, and provides updates for a next iteration using the aero-thermodynamic model.

5. The system of claim 1 wherein each each machine learning model of the plurality of machine learning models is trained to identify and learn a difference between responses generated by the aero-thermodynamic engine model and the real gas turbine engine under consideration for selected conditions associated with the real gas turbine engine's respective operating regime.

6. The system of claim 1, wherein the controller further includes a selection function configured to perform at least one of: select sensed parameters inlet conditions for use by the adaptive control laws in the event of no fault, select the estimates of inlet conditions for use by the adaptive control laws in the event of an inlet condition sensor fault.

7. The system of claim 6, wherein at least one of the sensed parameters inlet conditions and the estimated parameters inlet conditions includes compressor inlet temperature and compressor inlet pressure.

8. The system of claim 6, where the selection function is further configured to select a machine learning model among the plurality of machine learning models based on the estimates of inlet conditions for use by the adaptive control laws in the event of the inlet condition sensor fault in a selected operating regime of the gas turbine engine.

9. The system of claim 8 wherein each machine learning model of the plurality of machine learning models is configured to produce model correction errors based on a respective operating regime of the gas turbine engine.

10. The system of claim 8 wherein the selected operating regime of the gas turbine engine includes at least one of air start windmilling, thrust reversing, and anti icing modes of operation.

\* \* \* \* \*